(12) United States Patent
Chin et al.

(10) Patent No.: US 7,622,707 B2
(45) Date of Patent: Nov. 24, 2009

(54) POLAROID ABSOLUTE ENCODER

(75) Inventors: Yee Loong Chin, Taman Pinji Mewah (MY); Kee Siang Goh, Island Park (MY); Chee Keong Chong, Seberang Jaya (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 819 days.

(21) Appl. No.: 10/810,173

(22) Filed: Mar. 26, 2004

(65) Prior Publication Data

US 2005/0211886 A1     Sep. 29, 2005

(51) Int. Cl.
*G01D 5/34* (2006.01)

(52) U.S. Cl. .............................. 250/231.13; 250/231.14; 250/237 G

(58) Field of Classification Search . 250/231.1–231.18, 250/231.11–18, 237 G
See application file for complete search history.

(56) References Cited

U.S. PATENT DOCUMENTS

| | | | |
|---|---|---|---|
| 4,691,101 A | 9/1987 | Leonard | |
| 4,952,799 A | 8/1990 | Loewen | |
| 4,958,072 A * | 9/1990 | Hofler et al. | 250/231.13 |
| 5,235,177 A * | 8/1993 | Hutchinson et al. | 250/225 |
| 5,774,074 A | 6/1998 | Cooper et al. | |
| 6,653,619 B2 | 11/2003 | Chin et al. | |
| 6,879,405 B2 * | 4/2005 | Tamiya et al. | 356/616 |
| 2005/0002032 A1 * | 1/2005 | Wijntjes et al. | 356/364 |

OTHER PUBLICATIONS

"Two and Three Channel Codewheels for use with Agilent Optical Encoder Modules". From: Agilent, Technical Data. (12pp).

* cited by examiner

*Primary Examiner*—John R Lee

(57) ABSTRACT

A polaroid encoder system for detecting movement is disclosed. The system includes a movable polarizing code element. A detector module detects an amplitude based on how much illumination passes through one portion of the movable polarizing code element. A quadrant of the movable polarizing code element is determined based on how much illumination passes through another portion of the movable polarizing code element. The angular position of the movable polarizing code element can then be determined by using amplitude and the quadrant information.

22 Claims, 6 Drawing Sheets

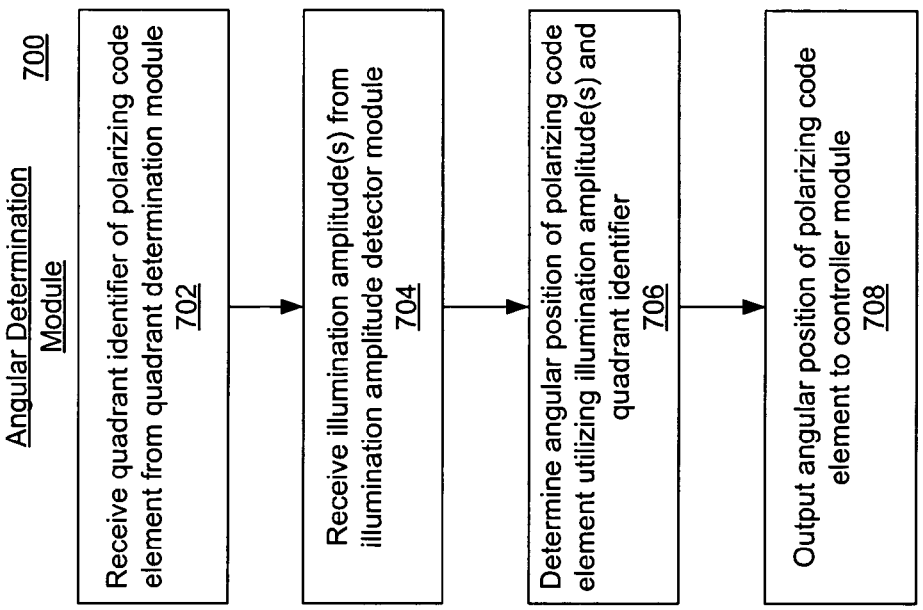
FIG. 7
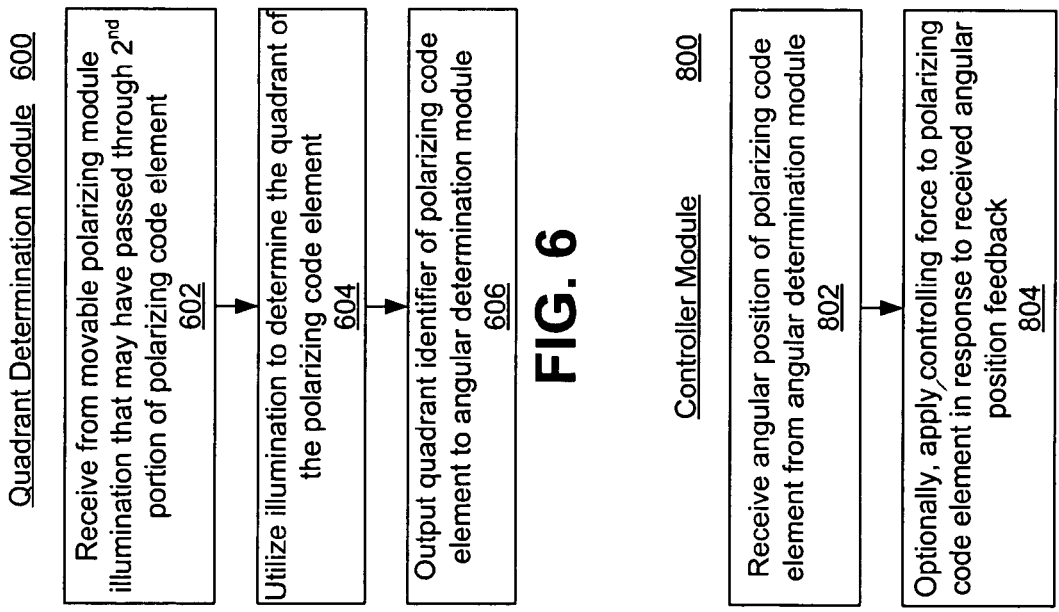
FIG. 6
FIG. 8

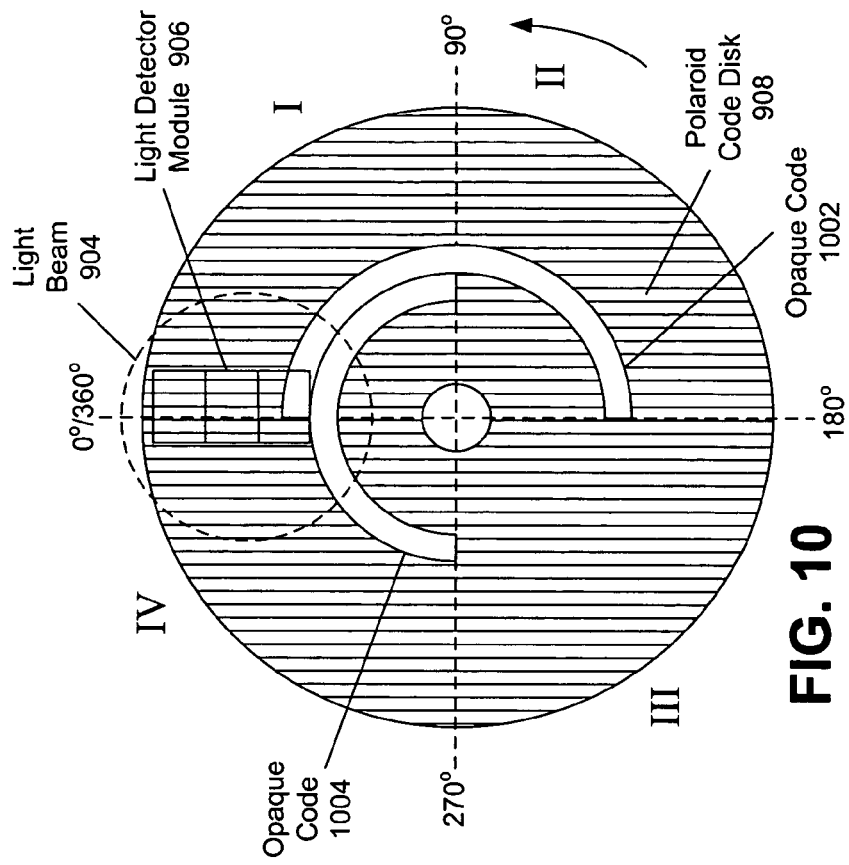
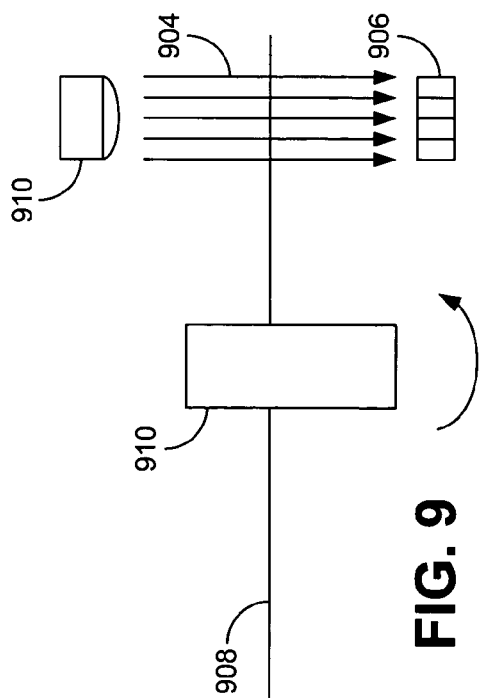
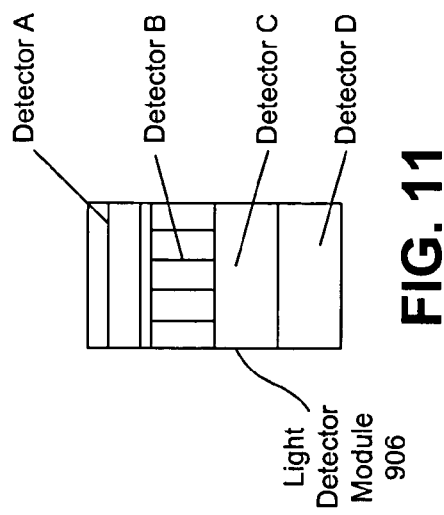
FIG. 10
FIG. 9
FIG. 11 excellent # POLAROID ABSOLUTE ENCODER

FIELD

The present invention relates to optical encoders.

BACKGROUND

A typical absolute encoder is a motion detector that provides closed-loop position feedback to a motor control system. Absolute encoders may be utilized in motor control systems where it is desirable to know the instantaneous position of a movable device such as a flood gate of a dam, a robotic arm, a crane, a large telescope, a value, and the like.

FIG. 1 is a block diagram of a conventional optical absolute encoder system 100 which includes a light emitter 102, a light detector 106, and a code disk 108 attached to a shaft 110 capable of rotating. Specifically, light emitter 102 outputs collimated light 104 towards detector 106. However, code disk 108 is located between light emitter 102 and detector 106 such that it interrupts the light 104 received by detector 106. FIG. 2 is a top view of a conventional code disk 108 which includes an exemplary pattern of uniquely coded tracks wherein each unique bit combination received by detector 106 represents a particular rotational position of code disk 108.

For instance, code disk 108 of FIG. 2 has eight tracks and as such, is understood to have an 8-bit resolution which is equivalent to $2^8$ or 256 positions per revolution. Since code disk 108 includes eight tracks, detector 106 is usually implemented with a photodiode for each code track resulting in a total of eight photodiodes. Therefore, as shaft 110 rotates, the photodiodes of detector 106 receives different light signals that pass through code disk 108 causing light detector 106 to produce an on/off digital output signal that indicates the position of code disk 108.

However, there are disadvantages associated with conventional absolute encoders. For example, if you want to increase the resolution of a code disk (e.g., 108), the number of code disk tracks are usually increased thereby resulting in an increase in the diameter of the code disk. Additionally, as the number of code disk tracks increases, the number of photodiodes utilized within a light detector (e.g., 106) are usually also increased. As a result of these modifications, the cost and size of the absolute encoder system undesirably increases.

SUMMARY

A polaroid encoder system for detecting movement is disclosed. The system includes a movable polarizing code element. A detector module detects an amplitude based on how much illumination passes through one portion of the movable polarizing code element. A quadrant of the movable polarizing code element is determined based on how much illumination passes through another portion of the movable polarizing code element. The angular position of the movable polarizing code element can then be determined by using amplitude and the quadrant information.

BRIEF DESCRIPTION OF THE DRAWINGS

FIG. 6 is a flowchart of operations performed by the quadrant determination module of FIG. 3 in accordance with an embodiment of the invention.

FIG. 7 is a flowchart of operations performed by the angular determination module of FIG. 3 in accordance with an embodiment of the invention.

FIG. 8 is a flowchart of operations performed by the controller module of FIG. 3 in accordance with an embodiment of the invention.

FIG. 9 is a block diagram of an optical polaroid absolute encoder in accordance with embodiments of the invention.

FIG. 10 is a plan view of one embodiment of a polaroid code disk in accordance with the invention.

FIG. 11 is a block diagram of one embodiment of an illumination detector module in accordance with the invention.

DETAILED DESCRIPTION

Figure 2:
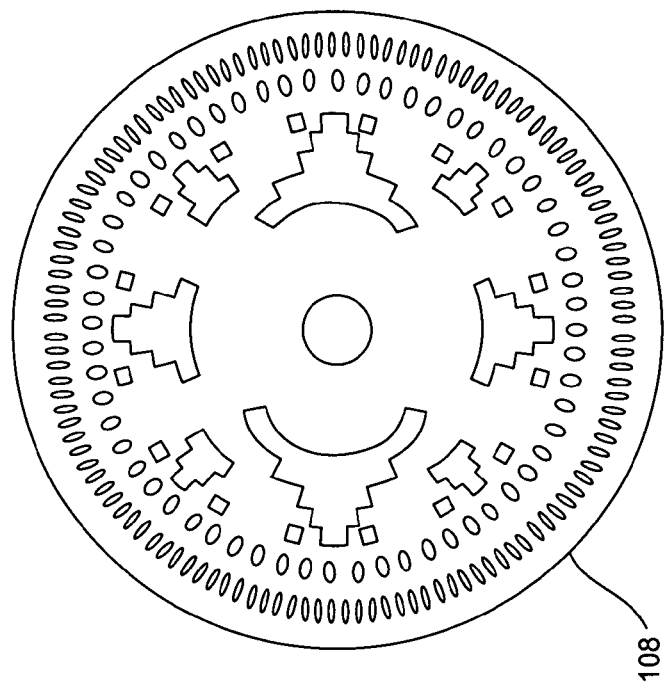
FIG. 2 is a plan view of a conventional code disk which includes an exemplary pattern.
Figure 1:
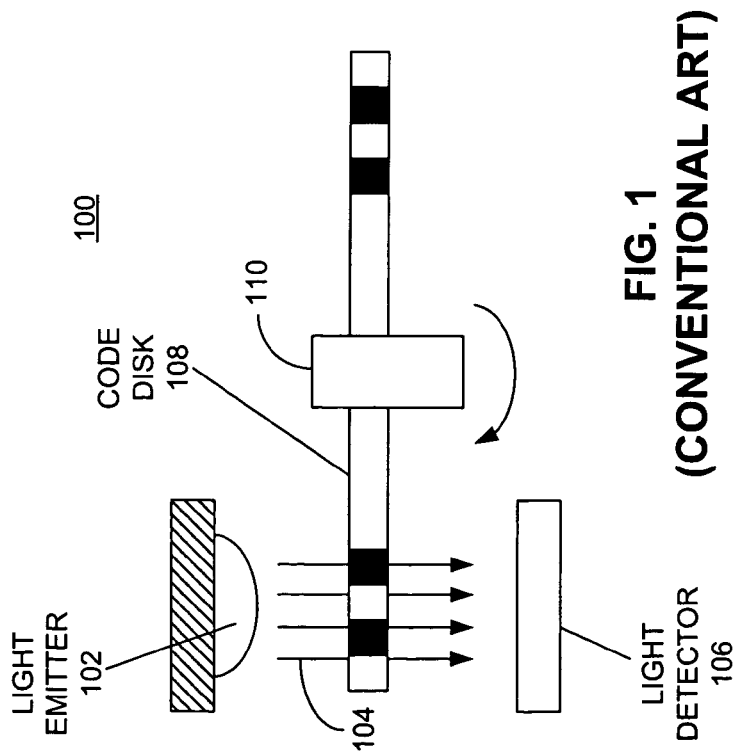
FIG. 1 is a block diagram of a conventional optical absolute encoder system.
Figure 3:
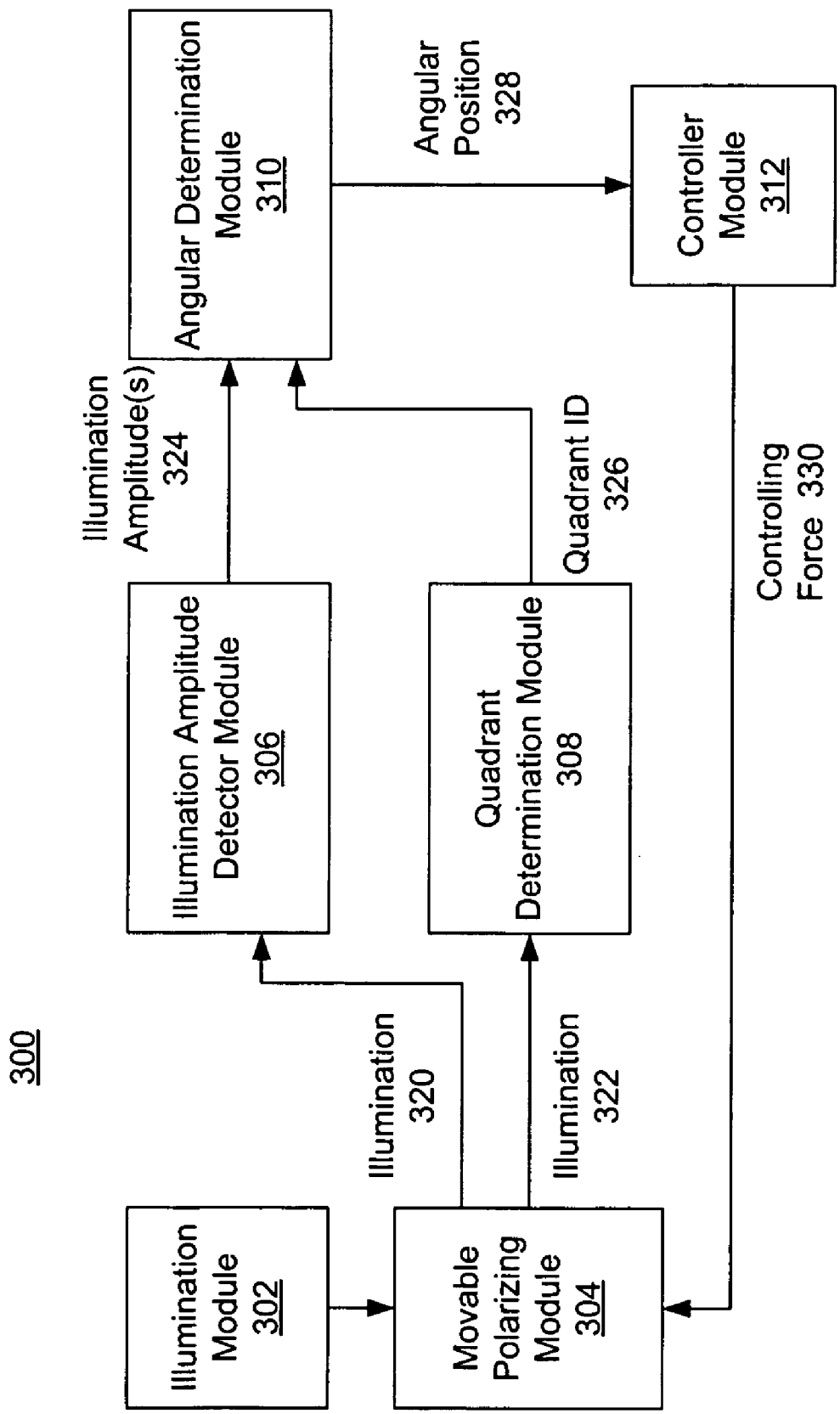
FIG. 3 is a block diagram of a polaroid absolute encoder system in accordance with embodiments of the invention.

FIG. 3 is a block diagram of a polaroid absolute encoder system 300 in accordance with embodiments of the invention. Specifically, the polaroid absolute encoder system 300 may be utilized in motor control systems where it is desirable to know the instantaneous position of a movable device, apparatus and the like. It is noted that modules of the polaroid absolute encoder system 300 can each be implemented by hardware or by any combination of hardware and software.

The polaroid absolute encoder system 300 includes an illumination module 302 that can output illumination which may be collimated in a particular direction. The illumination module 302 can be implemented in a wide variety of ways in accordance with the present embodiment. For example, illumination module 302 may include a light emitting diode (LED) as a light source and a lens to collimate the light in a desired direction. It is appreciated that the illumination module 302 may be implemented with any type of illumination source (or light source).

Within FIG. 3, a movable polarizing module 304 of the polaroid absolute encoder system 300 receives the illumination output by the illumination module 302. Specifically, a movable polarizing code element (e.g., disk) of the movable polarizing module 304 is exposed to the illumination output by the illumination module 302. Additionally, the movable polarizing module 304 is coupled to receive from a controller module 312 any controlling force 330 which moves the polarizing code element. The movable polarizing module 304 can output to an illumination amplitude detector module 306 any illumination 320 that may have passed through a first portion of the movable polarizing code element. Additionally, the movable polarizing module 304 can also output to a quadrant determination module 308 any illumination 322 that may have passed through a second portion of the movable polar- izing code element. It is appreciated that the movable polarizing module 304 may be coupled with the illumination amplitude detector module 306 and the quadrant determination module 308.

It is noted that the first portion of the movable polarizing code element of the movable polarizing module 304 may be defined in a wide variety of ways in accordance with the present embodiment. For example, the first portion of the movable polarizing code element may be an area of the polarizing code element that may be utilized as a part of determining one or more illumination amplitudes. It is also noted that the second portion of the movable polarizing code element of the movable polarizing module 304 may be defined in a wide variety of ways in accordance with the present embodiment. For example, the second portion of the movable polarizing code element may be an area of the polarizing code element that may be utilized as a part of determining (or identifying) a quadrant of the polarizing code element. The first and second portions of the movable polarizing code element of the movable polarizing module 304 may or may not overlap.

The illumination amplitude detector module 306 receives the illumination 320 output by the movable polarizing module 304. The illumination amplitude detector module 306 is able to detect (or determine) the amplitude of the received illumination 320. It is understood that the illumination amplitude detector module 306 may detect (or determine) the amplitude of the received illumination 320 in diverse ways. For example, the illumination amplitude detector module 306 may be implemented with two illumination detectors that are each covered by a static polarizing filter. Additionally, each of the polarizing filters may be oriented in a different manner. For example, the axis of polarization of a first polarizing filter can be substantially perpendicular to the axis of polarization of a second polarizing filter. As such, the illumination amplitude detector module 306 can determine the illumination amplitude which is detected by each of the two illumination detectors. Once the illumination amplitude detector module 306 determines the amplitude(s) of the received illumination 320, it outputs the illumination amplitude(s) 324 to an angular determination module 310. The illumination amplitude detector module 306 can be coupled with the angular determination module 310.

Within FIG. 3, the quadrant determination module 308 receives the illumination 322 output by the movable polarizing module 304. The quadrant determination module 308 is able to utilize the received illumination 322 to determine (or identify) which quadrant of the polarizing code element the illumination 322 passed through. It is appreciated that the quadrant determination module 308 may determine the quadrant of the polarizing code element in a wide variety of ways. For example, the quadrant determination module 308 may be implemented with two illumination detectors such that the quadrant of the polarizing code element can be determined by how much of illumination 322 (if any) each light detector detects. Once the quadrant determination module 308 determines the identity of the quadrant of the polarizing code element, it outputs the quadrant identity (ID) 326 to the angular determination module 310. The quadrant determination module 308 can be coupled with the angular determination module 310.

The angular determination module 310 receives the quadrant identity 326 output by the quadrant determination module 308 and the illumination amplitude(s) 324 output by the illumination amplitude detector module 306. The angular determination module 310 can utilize the received quadrant identity 326 and the illumination amplitude(s) 324 in order to determine a rotational angular position 328 of the polarizing code element with reference to a defined reference point. It is noted that the angular determination module 310 can determine the rotational angular position 328 in a diverse number of ways. For example, the angular determination module 310 can utilize a different relationship for each value of the quadrant identifier 326 in combination with the illumination amplitude(s) 324 in order to determine the rotational angular position 328 of the polarizing code element. Once the angular determination module 310 determines the rotational angular position 328 of the polarizing code element, it outputs the rotational angular position 328 to the controller module 312. The angular determination module 310 can be coupled with the controller module 312.

Within FIG. 3, the controller module 312 receives the rotational angular position 328 of the polarizing code element output by the angular determination module 310. The controller module 312 may utilize the feedback information of the rotational angular position 328 of the polarizing code element to exert a controlling force 330 to a movable device, apparatus, shaft, etc. (not shown) that is also coupled with the movable polarizing module 304. In this manner, the controller module 312 is able to know the exact rotational position of the movable device, apparatus, shaft, and the like when it knows the rotational angular position 328 of the polarizing code element of the movable polarizing module 304. Therefore, the polaroid absolute encoder system 300 can be utilized in motor control systems where it is desirable to know the instantaneous position of a movable device and the like.

Figure 4:
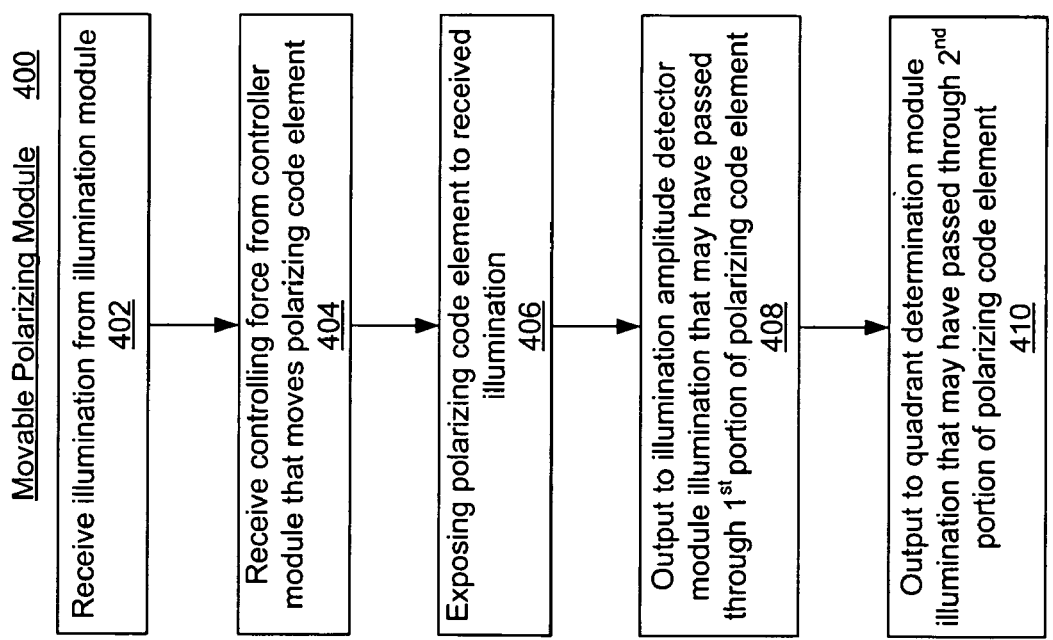
FIG. 4 is a flowchart of operations performed by the movable polarizing module of FIG. 3 in accordance with an embodiment of the invention.

FIG. 4 is a flowchart 400 of operations performed by the movable polarizing module 304 of FIG. 3 in accordance with an embodiment of the invention. Although specific operations are disclosed in flowchart 400, such operations are exemplary. That is, the movable polarizing module 304 is well suited to performing various other operations or variations of the operations recited in flowchart 400. It should be appreciated that the operations of flowchart 400 can be performed by software, by firmware, by hardware or by any combination thereof.

At operation 402, the movable polarizing module 304 is coupled and/or positioned in order to receive illumination output from the illumination module 302. At operation 404, the movable polarizing module 304 can receive the controlling force 330 output by the controller module 312. It is noted that the controlling force 330 may be capable of moving a polarizing code element of the movable polarizing module 304 in a one-to-one relationship with a movable device (not shown) that is being controlled by the controller module 312. It is appreciated that operation 402 and 404 can be implemented in a different order than that shown within FIG. 4. For example, operation 404 can occur before operation 402 or operations 402 and 404 can occur concurrently or simultaneously. Furthermore, operation 402 and/or operation 404 can occur throughout process 400.

At operation 406 of FIG. 4, the polarizing code element of the movable polarizing module 304 is exposed to the received illumination thereby enabling illumination to pass through different portions of it. It is noted that the polarizing code element may be implemented in a wide variety of ways. For example, the polarizing code element may be implemented to include, but is not limited to, code sections that do not allow illumination to pass through the polarizing code element while other sections or portions of the code element may not include such illumination blockers. It is noted that the polarizing code element of the movable polarizing module 304 can be implemented in a wide variety of ways. For example, the polarizing code element may be implemented with a polarizing material having a shape such as, but not limited to, a disk, an octagon, a hexagon, a square, a triangle, a polygon, and any other substantially planar shape or form.

At operation 408, the movable polarizing module 304 outputs to the illumination amplitude detector module 306 any illumination 320 that may have passed through a first portion of its movable polarizing code element. It is understood that the outputting of the light that passed through the first portion of the polarizing code element may be performed in diverse ways. For example, the illumination 320 may have passed through the first portion of the movable polarizing code element of the movable polarizing module 304 and be received by the illumination amplitude detector module 306. The movable polarizing module 304 may be coupled with the illumination amplitude detector module 306.

At operation 410 of FIG. 4, the movable polarizing module 304 outputs to the quadrant determination module 308 any illumination 322 that may have passed through a second portion of the movable polarizing code element. It is appreciated that the outputting of the illumination 322 that passed through the second portion of the polarizing code element may be performed in a wide variety of ways. For example, the illumination 322 may have passed through the second portion of the polarizing code element of the movable polarizing module 304 and be received by the quadrant determination module 308. The movable polarizing module 304 may be coupled with the quadrant determination module 308.

It is noted appreciated operations 408 and 410 can be implemented in a different order than that shown within FIG. 4. For example, operation 410 can occur before operation 408 or operations 408 and 410 can occur concurrently or simultaneously.

Figure 5:
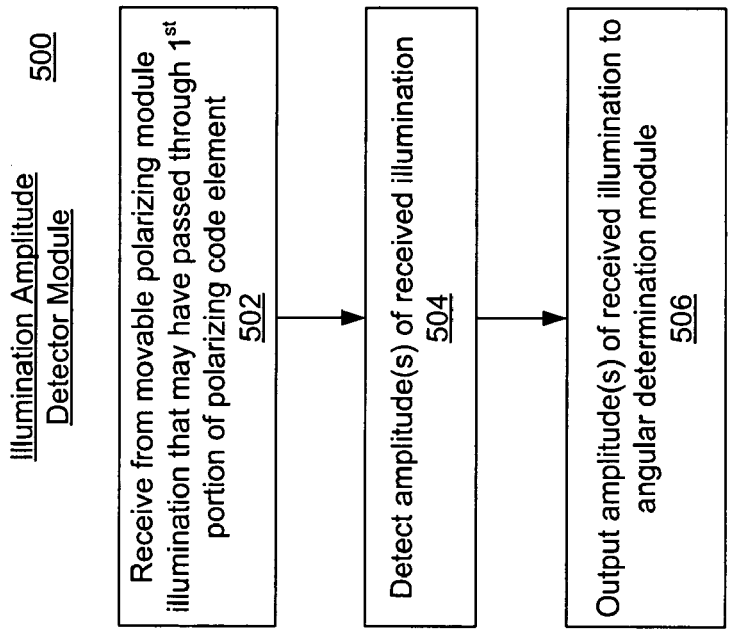
FIG. 5 is a flowchart of operations performed by the illumination amplitude detector module of FIG. 3 in accordance with an embodiment of the invention.

FIG. 5 is a flowchart 500 of operations performed by the illumination amplitude detector module 306 of FIG. 3 in accordance with an embodiment of the invention. Although specific operations are disclosed in flowchart 500, such operations are exemplary. That is, the illumination amplitude detector module 306 is well suited to performing various other operations or variations of the operations recited in flowchart 500. It should be appreciated that the operations of flowchart 500 can be performed by software, by firmware, by hardware or by any combination thereof.

At operation 502, the illumination amplitude detector module 306 receives from the movable polarizing module 304 any illumination 320 that may have passed through the first portion of the movable polarizing code element. It is appreciated that the illumination amplitude detector module 306 may receive illumination 320 in a wide variety of ways. For example, the illumination amplitude detector module 306 may be implemented with one or more polarizing filter elements that may be positioned over one or more illumination detector devices, such as but not limited to, a photodiode or photo-detector device. Additionally, the polarizing filter element(s) may be oriented or positioned in a wide variety of orientations. For example, if the illumination amplitude detector module 306 is implemented with two illumination detector devices, a static polarizing filter element can be positioned to cover each illumination detector device. Furthermore, each of the stationary polarizing filter elements can be oriented differently with respect to the other polarizing filter element. For instance, the polarization axis of one polarizing filter element can be substantially perpendicular to the polarization axis of the other polarizing filter element. As such, the illumination 320 detected by each detector device can vary with the rotation of the polarizing code element of the movable polarizing module 304.

At operation 504 of FIG. 5, the illumination amplitude detector module 306 detects the amplitude(s) of the received illumination 320 that may have passed through the first portion of the polarizing code element of the movable polarizing module 304. The amplitude detection at operation 504 by the illumination amplitude detector module 306 can be implemented in diverse ways. For example, the two illumination detector devices described above with reference to operation 502, each covered with a static polarizing filter element, can be coupled such that each produces an output current proportional to the illumination amplitude it detects from the received illumination 320.

At operation 506, the illumination amplitude detector module 306 outputs to the angular determination module 310 the detected amplitude (or amplitudes) 324 of the received illumination 320. It is noted that the illumination amplitude detector module 306 can be coupled with the angular determination module 310.

FIG. 6 is a flowchart 600 of operations performed by the quadrant determination module 308 of FIG. 3 in accordance with an embodiment of the invention. Although specific operations are disclosed in flowchart 600, such operations are exemplary. That is, the quadrant determination module 308 is well suited to performing various other operations or variations of the operations recited in flowchart 600. It should be appreciated that the operations of flowchart 600 can be performed by software, by firmware, by hardware or by any combination thereof.

At operation 602, the quadrant determination module 308 receives the illumination 322 output by the movable polarizing module 304 that may have passed through the second portion of the movable polarizing code element. It is understood that the quadrant determination module 308 may receive illumination 322 in diverse ways. For example, the quadrant determination module 308 may be implemented with one or more photodiodes (or photo-detectors) that can receive the illumination 322 that may have passed through the second portion of the movable polarizing code element.

At operation 604 of FIG. 4, the quadrant determination module 308 utilizes the received illumination 322 to determine which quadrant of the polarizing code element the illumination 322 passed through. It is appreciated that the quadrant determination module 308 may determine the quadrant of the polarizing code element in a wide variety of ways. For example, the quadrant determination module 308 may be implemented with two illumination detectors such that the quadrant of the polarizing code element can be determined by the amount of illumination 322 each illumination detector detects (if any). It is noted that the polarizing code element of the movable polarizing module 304 may include codes or coding (e.g., opaque codes, substantially opaque coding, and/ or any type or codes or coding) that enables each of its quadrants to be individually identified by the quadrant determination module 308.

At operation 606, the quadrant determination module 308 outputs to the angular determination module 310 the determined quadrant identifier 326 of the polarizing code element of the movable polarizing module 304. It is understood that the quadrant determination module 308 can be coupled with the angular determination module 310.

FIG. 7 is a flowchart 700 of operations performed by the angular determination module 310 of FIG. 3 in accordance with an embodiment of the invention. Although specific operations are disclosed in flowchart 700, such operations are exemplary. That is, the angular determination module 310 is well suited to performing various other operations or variations of the operations recited in flowchart 700. It should be appreciated that the operations of flowchart 700 can be performed by software, by firmware, by hardware or by any combination thereof.

At operation 702, the angular determination module 310 receives from the quadrant determination module 308 the quadrant identifier 326 associated with the polarizing code element of the movable polarizing module 304. At operation 704, the angular determination module 310 receives the illumination amplitude(s) 324 output by the illumination amplitude detector module 306. It is noted that operations 702 and 704 can be implemented in a different order than that shown within FIG. 7. For example, operation 704 can occur before operation 702 or operations 702 and 704 can occur concurrently or simultaneously.

At operation 706 of FIG. 7, the angular determination module 310 utilizes the received quadrant identifier 326 and the illumination amplitude(s) 324 in order to determine the rotational angular position 328 of the polarizing code element with reference to a defined reference point (or origin). It is noted that the angular determination module 310 can determine the rotational angular position 328 at operation 706 in a wide variety of ways. For example, the angular determination module 310 can utilize for each quadrant identifier 326 a different equation relationship involving the illumination amplitude(s) 324 in order to determine the rotational angular position 328 of the polarizing code element.

At operation 708, the angular determination module 310 outputs to the controller module 312 the determined rotational angular position 328 of the polarizing code element. The angular determination module 310 can be coupled with the controller module 312.

FIG. 8 is a flowchart 800 of operations performed by the controller module 312 of FIG. 3 in accordance with an embodiment of the invention. Although specific operations are disclosed in flowchart 800, such operations are exemplary. That is, the controller module 312 is well suited to performing various other operations or variations of the operations recited in flowchart 800. It should be appreciated that the operations of flowchart 800 can be performed by software, by firmware, by hardware or by any combination thereof.

At operation 802, the controller module 312 receives the rotational angular position 328 associated with the polarizing code element output by the angular determination module 310.

At operation 804 of FIG. 8, optionally, the controller module 312 may utilize the feedback information of the rotational angular position 328 associated with the polarizing code element to exert the controlling force 330 to a movable device, apparatus, shaft, etc. (not shown) that is also coupled with the movable polarizing module 304. In this manner, the controller module 312 is able to know the exact rotational position of the movable device, apparatus, shaft, and the like when it knows the rotational angular position 328 of the polarizing code element of the movable polarizing module 304. It is noted that controller module 312 can be implemented in a wide variety of ways. For example, the controller module 312 can be implemented as, but is not limited to, a motor controller, a proportional integral derivations (PID) controller, a fuzzy logic controller, or a neural network controller.

FIG. 9 is a block diagram of an optical polaroid absolute encoder 900 in accordance with embodiments of the invention. The polaroid encoder system 900 includes a movable polarizing code element 908. A detector module 906 detects amplitudes based on how much illumination passes through one portion of the movable polarizing code element 908. A quadrant of the movable polarizing code element 908 is determined based on how much illumination passes through another portion of the movable polarizing code element 908. The angular position of the movable polarizing code element 908 can then be determined by using amplitudes and the quadrant information.

Specifically, the polaroid encoder system 900 includes an illumination module 902, a detector module 906, and a polaroid code disk 908 coupled to a shaft 910 capable of rotating. Specifically, illumination module 902 can generate and output illumination 904 (e.g., light) directed towards the polaroid code disk 908 and detector module 906. It is noted that the polaroid absolute encoder 900 is a transmissive type of encoder.

Within FIG. 9, as light 904 is generated and output by light source 902, the light 904 may pass through the polaroid code disk 908 and reach a light detector module 906. The light detector module 906 may be implemented with four (for example but not limited to) light detector devices wherein two of the light detector devices are utilized for determining the quadrant of the polaroid code disk 908 located above (or in front of) light detector module 906 while the other two light detector devices are each used to determine an amplitude of light 904.

Specifically, each of the amplitude detector devices can be covered with a static (or stationary or fixed) polarizing filter element that are substantially oriented perpendicular to each other. As such, when the polarizing code disk 908 moves (e.g., in a counterclockwise direction) above (or in front of) the polarizing filter elements of the light detector module 906, each of the light detector devices may receive a particular amount of light 904 based on the orientation of the code disk 908 and each of the static polarizing filters. For example, if the polarization axis of the polaroid code disk 908 is substantially perpendicular to the polarization axis of one of the static polarizing filters, its corresponding detector device will not receive any of light 904. Conversely, if the polarization axis of the polaroid code disk 908 is substantially parallel to the polarization axis of one of the static polarizing filters, its corresponding detector device will receive a maximum amplitude of light 904. Therefore, by using each of the detected amplitudes of the light 904 along with the determined quadrant of the polaroid code disk 908, an angular determination module (e.g., 310) can determine the rotational angular position of the polaroid code disk 908 with reference to a defined position (or origin).

Within FIG. 9, it is noted that light source 902 can be one embodiment in accordance with the invention of the illumination module 302 (FIG. 3). Additionally, polaroid code disk 908 and shaft 910 can be one embodiment in accordance with the invention of the movable polarizing module 304. Furthermore, light detector module 906 can be part of one embodiment in accordance with the invention of the illumination amplitude detector module 306 and the quadrant determination module 308.

FIG. 10 is a plan view of one embodiment of the polaroid code disk 908 (FIG. 9) in accordance with the invention. The polaroid code disk 908 includes an axis of polarization that is indicated by the vertical lines shown within it. Additionally, the polaroid code disk 908 includes opaque codes 1002 and 1004 along with quadrants I, II, III, and IV. Specifically, within the present embodiment, quadrant I is defined as the area of polaroid code disk 908 located between and inclusive of zero degrees through 90 degrees while quadrant II is defined as the area of polaroid code disk 908 located between and inclusive of 90 degrees through 180 degrees. Furthermore, quadrant III is defined as the area of polaroid code disk 908 located between and inclusive of 180 degrees through 270 degrees while quadrant IV is defined as the area of polaroid code disk 908 located between and inclusive of 270 degrees through 360 degrees.

Within FIG. 10, an exemplary position and orientation of the light detector module 906 is shown along with illumination (e.g., light) 904 that can be generated and output by illumination module 902 (FIG. 9). As such, the illumination 904 is able to illuminate a portion of the polaroid code disk 908. The illumination 904 is unpolarized. However, when illumination 904 passes through the polaroid code disk 908, illumination 904 will be polarized to one direction that is parallel to the polarization axis of the polaroid code disk 908. The opaque codes 1002 and 1004 are positioned on the polaroid code disk 908 to correspond with the location of light detector elements C and D, respectively, of the light detector module 906 shown within FIG. 11. It is understood that the opaque codes 1002 and 1004 may be implemented in a wide variety of ways. For example, the opaque codes 1002 and 1004 may each be implemented with substantially opaque material. As such, the opaque codes 1002 and 1004 may also be referred to as substantially opaque codes (or codings) 1002 and 1004. Within another embodiment, codes 1002 and 1004 may be implemented in any manner such that each quadrant of the polaroid code disk 908 located substantially above (or in front of) light detector module 906 can be identified.

It is noted that a first portion of the polaroid code disk 908 that may be utilized as a part of determining one or more illumination amplitudes can be, but is not limited to, the area of the polaroid code disk 908 that can pass over light detector elements A and B of the light detector module 906 of FIG. 11. As such, the first portion may be referred to as a concentric portion of the polaroid code disk 908. It is also noted that a second portion of the polaroid code disk 908 that may be utilized as a part of determining (or identifying) a quadrant of the polaroid code disk 908 can be, but is not limited to, the area of the polaroid code disk 908 that may pass over light detector elements C and D of the light detector module 906 of FIG. 11. Therefore, the second portion may also be referred to as a concentric portion of the polaroid code disk 908. It is understood that the first portion and the second portion of the polaroid code disk 908 may or may not overlap. As shown in FIG. 10, the substantially opaque codes 1002 and 1004 can each be located within a segment of the second portion of the polaroid code disk 908.

FIG. 11 is a block diagram of one embodiment of the light detector module 906 in accordance with the invention. The light detector module 906 may be implemented with light detector elements C and D which can be used to determine which quadrant is location above (or in front of) the light detector module 906. Additionally, the light detector module 906 may also be implemented with light detector elements A and B which can be used to determine the amplitudes of received illumination 904. Light detector elements A and B can each be covered by a static (or stationary or fixed) polaroid filter. Specifically, as shown within FIG. 11, the axis of polarization of the filter covering light detector element A can be oriented substantially in the horizontal direction while the axis of polarization of the filter covering light detector element B can be oriented substantially in the vertical direction. It is noted that the orientations of the polarizing filters are exemplary. Additionally, it is understood that the direction of the polarization axis of the filter covering light detector element A can be switched with the direction of the axis polarization of the filter covering light detector element B.

It is noted that light detector element A of the light detector module 906 of FIG. 11 would not detect any of illumination 904 if the polaroid code disk 908 is oriented as shown in FIG. 10 since the polarizing axis of the static filter covering light detector element A is substantially perpendicular to the polarizing axis of the code disk 908. Conversely, since the polarizing axis of the static filter covering light detector element B of FIG. 11 is substantially parallel to the polarizing axis of the code disk 908 (FIG. 10), light detector B will detect a maximum amplitude of illumination 904 that passes through both the polaroid code disk 908 and the polarizing filter covering light detector element B.

Light detector elements C and D (FIG. 11) can be utilized together to determine which quadrant of the polaroid code disk 908 is substantially located above (or in front of) light detector module 906. Specifically, the combination coding of opaque codes 1002 and 1004 (FIG. 10) are different for each quadrant of the polaroid code disk 908. For example, when quadrant I of the polaroid code disk 908 is located above (or in front of) light detector module 906, the opaque codes 1002 and 1004 substantially block any of illumination 904 from being detected by light detector elements C and D. When quadrant 11 of the polaroid code disk 908 is located above (or in front of) light detector module 906, the opaque code 1002 substantially blocks any of illumination 904 from being detected by light detector element C while opaque code 1004 does not exist within that quadrant such that light detector element D may be able to detect illumination 904. Additionally, when quadrant III of the polaroid code disk 908 is located above (or in front of) light detector module 906, the opaque codes 1002 and 1004 do not exist within that quadrant and as such, light detector elements C and D may be able to detect illumination 904. When quadrant IV of the polaroid code disk 908 is located above (or in front of) light detector module 906, the opaque code 1004 substantially blocks any of illumination 904 from being detected by light detector element D while opaque code 1002 does not exist within that quadrant such that light detector element C may be able to detect illumination 904.

For example, if the light detector elements C and D both receive a low amplitude of illumination 904, then it is determined that quadrant I of the polaroid code disk 908 is located above (or in front of) light detector module 906. If the light detector element C receives a low amplitude of illumination 904 while the light detector element D receives a high amplitude, then it is determined that quadrant II of the polaroid code disk 908 is located above (or in front of) light detector module 906. Additionally, if the light detector elements C and D both receive a high amplitude of illumination 904, it is determined that quadrant III of the polaroid code disk 908 is located above (or in front of) light detector module 906. Furthermore, if the light detector element C receives a high amplitude of illumination 904 while the light detector element D receives a low amplitude, it is determined that quadrant IV of the polaroid code disk 908 is located above (or in front of) light detector module 906.

Figure 12:
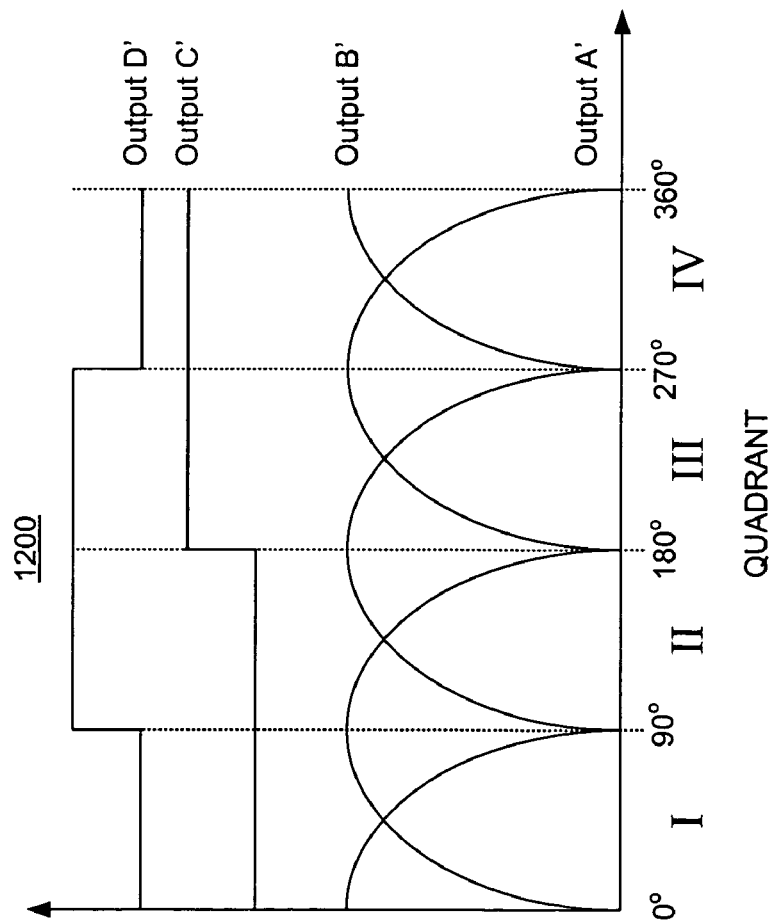
FIG. 12 is a chart illustrating one embodiment of outputs of illumination detectors of FIG. 11 in accordance with the invention.

FIG. 12 is a chart 1200 illustrating one embodiment of outputs of light detector elements A-D of FIG. 11 in accordance with the invention. The horizontal axis of chart 1200 represents the angular rotational position in degrees of the polarizing code disk 908 of FIGS. 9 and 10. Additionally, the different quadrants of the polarizing code disk 908 are also indicated along the horizontal axis of chart 1200. For example, quadrant I includes zero degrees to 90 degrees of the polarizing code disk 908 while quadrant 11 includes 90 degrees to 180 degrees. Additionally, quadrant III includes 180 degrees to 270 degrees of the polarizing code disk 908 while quadrant IV includes 270 degrees to 360 degrees.

Within chart 1200, each of outputs A', B', C', and D' represents the amplitude detected of illumination 904 by each of the light detector elements A, B, C, and D, respectively, of the light detector module 906 as the polaroid code disk 908 is rotated one revolution in a counterclockwise direction. Specifically, outputs C' and D' are utilized to determine which quadrant of the polaroid code disk 908 is located above (or in front of) the light detector module 906 while outputs A' and B' are utilized to help determine the rotational angular position of the polaroid code disk 908.

For example, the amplitudes detected of illumination 904 by light detector elements C and D may each result in a current that can be compared to a defined (or predefined) threshold current to produce outputs C' and D'. Depending on how the resultant amplitude current compares to the threshold current, outputs C' and D' may either produce a digital low or high signal. For instance, if the light detector element C detects an amplitude of illumination 904 that results in a current less than the threshold current, output C' is a digital low signal as shown from zero degrees to 180 degrees of chart 1200. Alternatively, if the light detector element C detects an amplitude of illumination 904 that results in a current greater than or equal to the threshold current, output C' is a digital high signal as shown from 180 degrees to 360 degrees of chart 1200.

It is noted that the relationship between the amplitude current and the threshold current may be modified in a wide variety of ways. For example, output C' may be a digital low signal if the detected amplitude of illumination 904 by light detector element C results in a current less than or equal to the threshold current. Alternatively, output C' may be a digital high signal if the detected illumination amplitude of illumination 904 by light detector element C results in a current greater than the threshold current. Furthermore, output C' may be a digital low signal if the detected illumination amplitude of illumination 904 by light detector element C is greater than the threshold current. Also, output C' may be a digital high signal if the detected illumination amplitude of illumination 904 by light detector element C is less than or equal to the threshold current. It is noted that light detector element D and output D' can operate in a manner similar to light detector element C and output C' as described herein.

As shown within FIG. 12, when outputs C' and D' of chart 1200 both produce a logical low signal, quadrant I of the polaroid code disk 908 is located above (or in front of) light detector module 906. When output C' produces a logical low and output D' produces a logical high, quadrant II of the polaroid code disk 908 is located above (or in front of) light detector module 906. When outputs C' and D' both produce a logical high, quadrant III of the polaroid code disk 908 is located above (or in front of) light detector module 906. When output C' produces a logical high and output D' produces a logical low, quadrant IV of the polaroid code disk 908 is located above (or in front of) light detector module 906. In this manner, quadrant determination module 308 may determine which quadrant of the polaroid code disk 908 is located above (or in front of) the light detector module 906.

Once outputs C' and D' are utilized to determine the quadrant of the polarized code disk 908, the particular θ equation (shown below) corresponding to the determined quadrant can then be used along with outputs A' and B' to determine the absolute angular position of the code disk 908. It is noted that the following θ equations are in accordance with an embodiment of the invention.

$$\theta = \tan^{-1}(\text{Output } A' / \text{Output } B') \quad \text{Quadrant I}$$
$$\theta = \tan^{-1}(\text{Output } A' / \text{Output } B') + 90 \text{ degrees} \quad \text{Quadrant II}$$
$$\theta = \tan^{-1}(\text{Output } A' / \text{Output } B') + 180 \text{ degrees} \quad \text{Quadrant III}$$
$$\theta = \tan^{-1}(\text{Output } A' / \text{Output } B') + 270 \text{ degrees} \quad \text{Quadrant IV}$$

Once the absolute angular position of the code disk 908 is determined, it can be utilized by a controller module (e.g., 312) to control a device, an apparatus, a shaft, or the like that can be coupled with the polarizing code disk 908.

Figure 13:
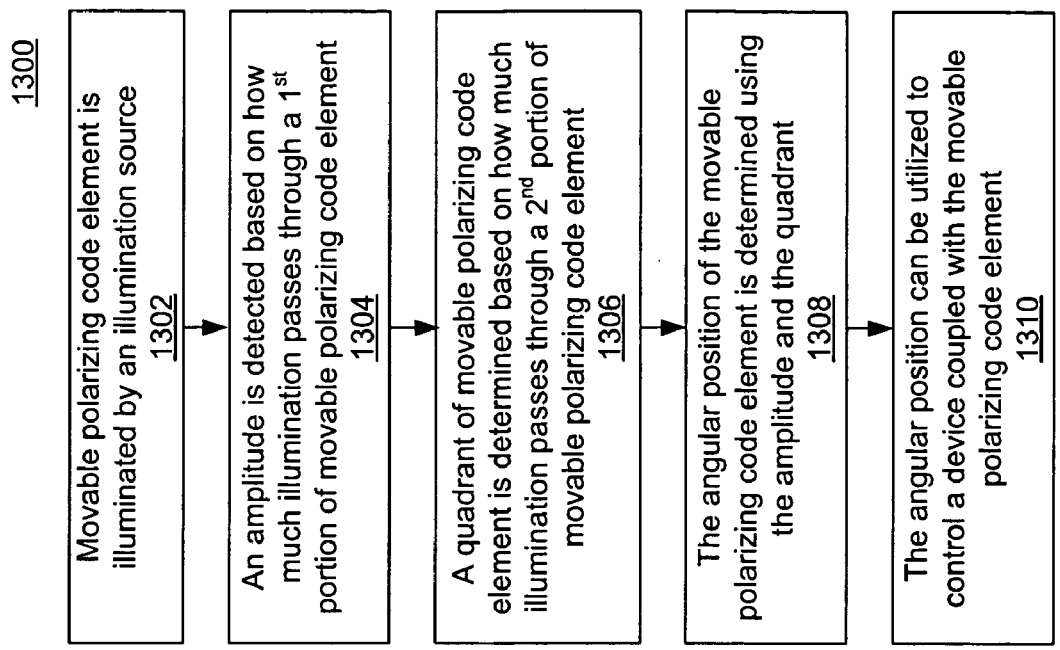
FIG. 13 is a flowchart of operations performed by an automatic polaroid absolute encoder in accordance with an embodiment of the invention.

FIG. 13 is a flowchart 1300 of operations for determining an angular position of a movable polarizing code element in accordance with an embodiment of the invention. Although specific operations are disclosed in flowchart 1300, such operations are exemplary. That is, the present embodiment is well suited to performing various other operations, variations of the operations recited in flowchart 1300, or fewer operations than those recited in flowchart 1300. It should be appreciated that the operations of flowchart 1300 can be performed by software, by firmware, by hardware or by any combination thereof.

The present embodiment provides a method for determining an angular position of a movable polarizing code element. For example, a movable polarizing code element can be illuminated by an illumination source. An amplitude can be detected based on how much illumination passes through one portion of the movable polarizing code element. A quadrant of the movable polarizing code element can be determined based on how much illumination passes through another portion of the movable polarizing code element. The angular position of the movable polarizing code element can then be determined by using amplitude and the quadrant information. Optionally, the angular position can be utilized to control the movement of a device (or an apparatus, a shaft, or the like) coupled with the movable polarizing code element.

At operation 1302, a movable polarizing code element can be illuminated by an illumination source. It is noted that operation 1302 can be performed in a wide variety of ways. For example, the illumination of the movable polarizing code element can be implemented in any manner similar to that described herein, but is not limited to such.

At operation 1304 of FIG. 13, an amplitude can be detected based on how much illumination passes through a first portion of the movable polarizing code element. It is appreciated that operation 1304 can be performed in diverse ways. For example, the detecting of the amplitude based on how much illumination passes through the first portion of the movable polarizing code element can be implemented in any manner similar to that described herein, but is not limited to such.

At operation 1306, a quadrant of the movable polarizing code element can be determined based on how much illumination passes through a second portion of the movable polarizing code element. It is understood that operation 1306 can be performed in a wide variety of ways. For example, the determining of the quadrant of the movable polarizing code element based on how much illumination passes through the second portion of the movable polarizing code element can be implemented in any manner similar to that described herein, but is not limited to such.

At operation 1308 of FIG. 13, the angular position of the movable polarizing code element can be determined using the amplitude and the quadrant. It is noted that operation 1308 can be performed in diverse ways. For example, the determining of the angular position of the movable polarizing code element using the amplitude and the quadrant can be implemented in any manner similar to that described herein, but is not limited to such.

At operation 1310, the angular position can be utilized to control the movement of a device (or an apparatus, a shaft, or the like) coupled with the movable polarizing code element. It is appreciated that operation 1310 can be performed in a wide variety of ways. For example, the utilizing of the angular position to control a device (or the like) coupled with the movable polarizing code element can be implemented in any manner similar to that described herein, but is not limited to such. It is noted that process 1300 may be modified to not include operation 1310.

The foregoing descriptions of specific embodiments of the invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A polaroid encoder system for detecting movement, said system comprising:
    a movable polarizing code element comprising a first concentric code, a second concentric code and a set of quadrants, the first and second concentric codes in contact with one another over one of the four quadrants of said movable polarizing code element;
    a detector module to detect an amplitude based on how much illumination passes through a first portion of said movable polarizing code element, said detector module comprising:
        a first illumination detector covered with a first static polarizing filter that is oriented in a first direction;
        a second illumination detector covered with a second static polarizing filter that is oriented in a second direction;
    a first determination module to identify a quadrant of said movable polarizing code element based on how much illumination passes through a second portion of said movable polarizing code element, the first determination module responsive to a single illumination source that emits light that is directed at and unaltered before encountering the movable polarizing code element and thereafter unaltered before encountering a third illumination detector; and
    a second determination module coupled to receive said amplitude and said quadrant and configured to determine an angular position of said movable polarizing code element using said amplitude and said quadrant.

2. The system of claim 1, further comprising:
    a controller module coupled to receive said angular position of said movable polarizing code element, wherein said controller module uses said angular position to control a movable device coupled with said movable polarizing code element.

3. The system of claim 2, wherein said controller module is selected from the group consisting of a neural network controller, a fuzzy logic controller, a proportional integral derivations controller, and a motor controller.

4. The system of claim 1, wherein said second direction is substantially perpendicular to said first direction.

5. The system of claim 4, wherein said first illumination detector and said second illumination detector each comprise a photodiode.

6. The system of claim 1, wherein said first and second concentric codes are substantially opaque.

7. The system of claim 6, wherein said first and second concentric codes are located within a segment of said second portion of said movable polarizing code element.

8. The system of claim 1, wherein said first determination module further comprises a second illumination detector located on the same side of said movable polarizing code element as said first and second illumination detectors of said detector module.

9. A method for determining angular position of a movable polarizing code element, said method comprising:
    illuminating said movable polarizing code element comprising a first concentric code, a second concentric code and a set of quadrants, the first and second concentric codes in contact with one another over one of the quadrants of said movable polarizing code element, said illuminating comprising an illumination source such that emitted light is directed at and unaltered before encountering the movable polarizing code element and thereafter unaltered before encountering a third illumination detector;
    detecting a first amplitude based on how much illumination passes through a first portion of said movable polarizing code element and a first static polarizing filter oriented in a first direction, said detecting said first amplitude comprises utilizing a first photodiode;
    detecting a second amplitude based on how much illumination passes through said first portion of said movable polarizing code element and a second static polarizing filter oriented in a second direction, said detecting said second amplitude comprises utilizing a second photodiode;
    determining a quadrant of said movable polarizing code element based on how much illumination passes through a second portion of said movable polarizing code element, said determining said quadrant comprises utilizing a third photodiode, wherein said first, second, and third photodiodes are located on one side of said movable polarizing code element; and
    determining said angular position of said movable polarizing code element using said first amplitude, second amplitude and said quadrant.

10. The method as described in claim 9, further comprising:
    utilizing said angular position to control movable apparatus coupled with said movable polarizing code element.

11. The method as described in claim 9, wherein said first and second concentric codes are substantially opaque.

12. The method as described in claim 11, wherein said determining said quadrant comprises utilizing said substantially opaque first and second concentric codes.

13. The method as described in claim 12, wherein said determining said quadrant further comprises utilizing a fourth photodiode.

14. The method as described in claim 9, wherein said first direction is substantially perpendicular to said second direction.

15. The method as described in claim 10, wherein said utilizing said angular position to control said movable apparatus is performed by a controller module.

16. The method as described in claim 9, wherein said controller module is selected from the group consisting of a neural network controller, a fuzzy logic controller, a proportional integral derivations controller, and a motor controller.

17. A system for determining angular position of a movable polarizing code element, said system comprising:

means for illuminating said movable polarizing code element comprising a first concentric code, a second concentric code and a set of quadrants, the first and second concentric codes in contact with one another over one of the quadrants of said movable polarizing code element, said means for illuminating comprising an illumination source such that emitted light is directed at and unaltered before encountering the movable polarizing code element and thereafter unaltered before encountering a third illumination detector;

means for detecting a first amplitude based on how much illumination passes through said first portion of said movable polarizing code element and a first static polarizing filter oriented in a first direction;

means for detecting a second amplitude based on how much illumination passes through said first portion of said movable polarizing code element and a second static polarizing filter oriented in a second direction;

means for identifying a quadrant of said movable polarizing code element based on how much illumination passes through a second portion of said movable polarizing code element, wherein said means for identifying said quadrant comprises an illumination detector; and means for determining said angular position of said movable polarizing code element using said first amplitude, second amplitude and said quadrant.

18. The system of claim 17, further comprising:

means for utilizing said angular position to move an apparatus coupled with said movable polarizing code element.

19. The system of claim 17, wherein said first and second concentric codes are substantially opaque.

20. The system of claim 19, wherein said first and second concentric codes substantially obscures illumination from being received by said illumination detector of said means for identifying said quadrant.

21. The system of claim 17, wherein said first direction is substantially perpendicular to said second direction.

22. The system of claim 17, wherein said means for detecting said first amplitude comprises a photodiode covered by said first static polarizing filter.

* * * * *